Dec. 10, 1946.  W. C. ANDERSON ET AL  2,412,382
ELECTRIC TROLLEY CONDUCTOR DUCT AND COLLECTOR
Filed April 17, 1945  2 Sheets-Sheet 2
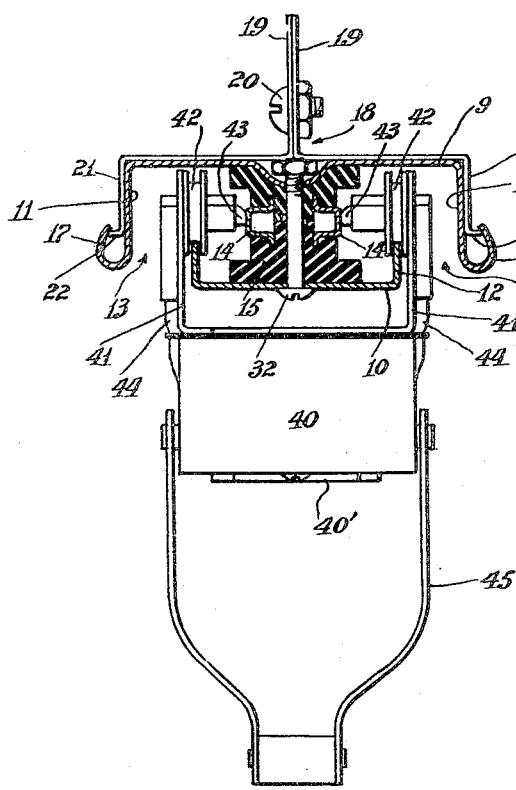
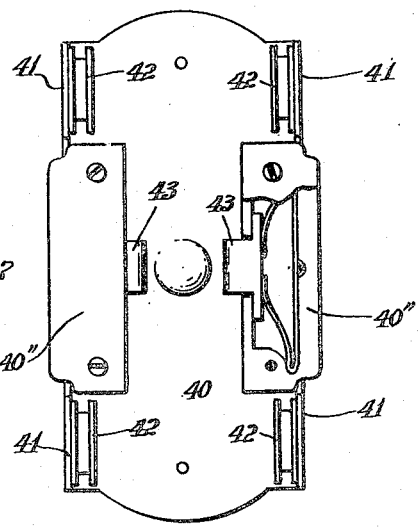
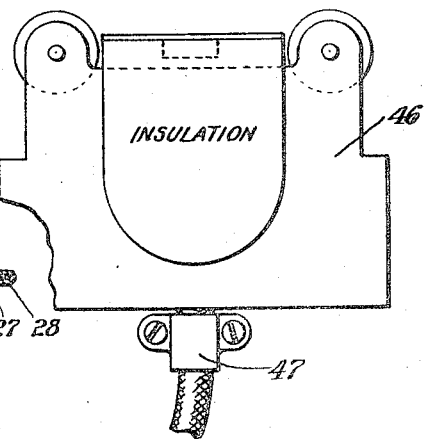
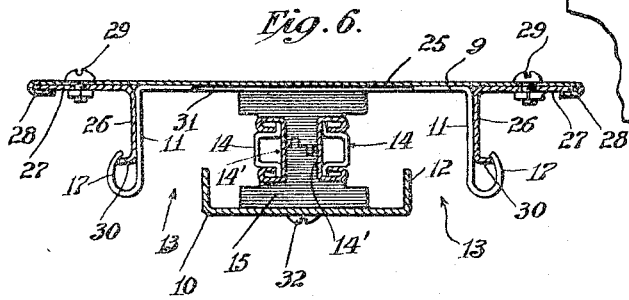
INVENTORS
William C. Anderson
George J. Naber
BY
ATTORNEY Patented Dec. 10, 1946

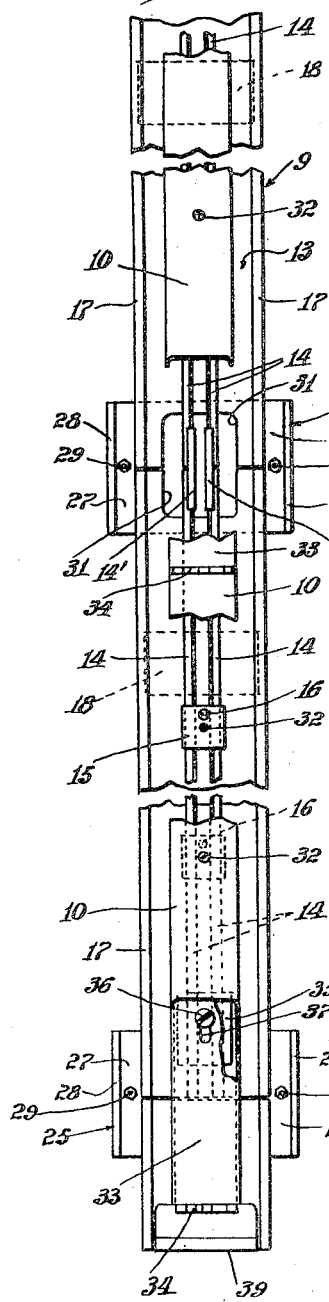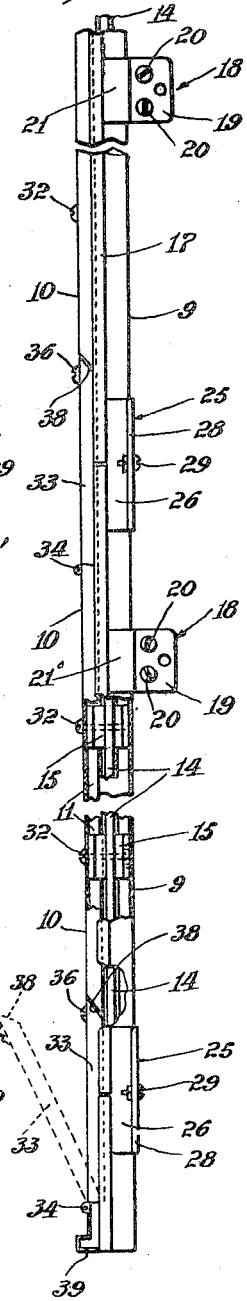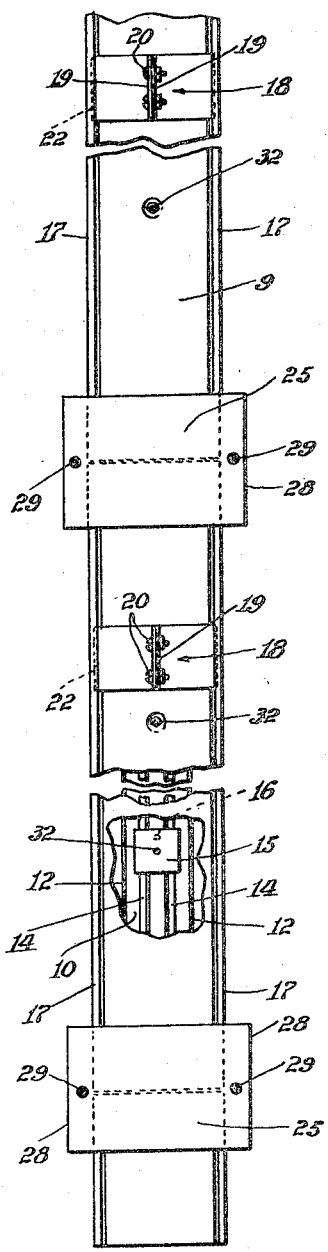

2,412,382

UNITED STATES PATENT OFFICE 2,412,382

ELECTRIC TROLLEY CONDUCTOR DUCT AND COLLECTOR

William C. Anderson, Burlington, and George J. Naber, Erlanger, Ky., assignors to The Trumbull Electric Manufacturing Company, Plainville, Conn., a corporation of Connecticut Application April 17, 1945, Serial No. 588,876

15 Claims. (Cl. 191—23)

Our invention relates particularly to bus duct systems. The main object is to provide apparatus which is electrically and mechanically safe and reliable for use with a trolley collector type system.

Another object is to provide a simple, compact, attractive, light and inexpensive but strong apparatus.

In carrying out these objects we form the duct of two channel or trough-like members one of which is wider than the other and has its flanges overlapping the other one and lying outside of its flanges so as to leave two narrow slots between the flanges of the respective members.

The bus bars are supported in the space between the duct members and are preferably of channel-like cross section.

The wider duct member constitutes the main support and preferably has its edges rolled or curled so as to form grooves to accommodate hangers and splicing members. The narrower duct member constitutes the trolley track member and may have hinged or otherwise removable or drop-out parts to provide for direct access to the bus bars and for insertion and removal of the trolley collector.

Fig. 1 is a side or edge view on a small scale of a portion of a bus bar duct system embodying one form of our invention, parts being broken away and shown in section.

Figs. 2 and 3 are views of the opposite faces of the parts shown in Fig. 1, parts being broken away.

Fig. 4 is a cross sectional view of the duct and bus bars on a larger scale and showing one form of hanger and one form of trolley or current collector.

Fig. 5 is a plan view of the form of trolley shown in Fig. 4, parts being broken away.

Fig. 6 is a cross sectional view of the duct and bus bar and showing the splicing members for connecting adjacent sections and bus bars.

Fig. 7 is a side view of one form of trolley collector suitable for use with our system.

The main body or casing of the duct system is made up of two channel-like members 9 and 10 having spaced flanges 11 and 12 which overlap but leave slots 13, 13 on opposite sides of the narrower duct member.

The bus bars 14, 14 are also of channel form with flanges supported at intervals in insulating blocks 15. Adjacent ends of bus bars are connected by splice pieces 14'. Each block is preferably divided transversely so as to facilitate attachment and removal of the bus bars. The parts may be secured together if desired, in any suitable way, as for instance by a screw or bolt 16.

The flanges of the wider duct member preferably terminate in rolled or curled edges 17 which greatly reinforce the duct member and also afford convenient means for the attachment of suitable hangers such as 18 (Fig. 4). This form of hanger is formed of two substantially Z-shaped parts, each having an upstanding flange 19 and these flanges are connected by one or more bolts 20 and constitute means for connection of a hanger rod, bolt or other device (not shown). Each hanger part has a flange 21 which embraces one of the flanges 11 and terminates in an outwardly turned hook-like flange 22 which is interlocked in the adjacent curled edge 17 of the duct member 9.

In Fig. 6 is shown a device for uniting the ends of successive sections of the casing and which may also serve to act as a hanger. This consists of a plate 25 and depending plates 26. Each of the latter has a flange 27 at one end interlocked with a hook-like flange 28 of the top plate 25 and secured to the top plate by one or more fastening devices such as a bolt or screw 29. The other end of the plate 26 terminates in a hook-like flange 30 which interlocks with the rolled or curled edge 17 of the duct member 9.

When the plate 25 overlies the ends of adjacent duct sections, the bolts 29 serve to clamp the plate to the duct sections. Each end of a duct section may be cut out at 31 to facilitate access to the bus bars. The lower or track sections of the duct are secured to the wider or cover sections by screws or bolts or preferably rivets 32 which also hold the insulating blocks 15 in place.

At one or more places along the duct we provide a removable channel-shaped member or drop-out 33 which is hinged at 34 so that it can be swung from the plane of the narrow duct member 10. In the end of the drop-out 33 opposite the hinge is supported a bolt-like member 35 which slides in the channel-like section of the drop out 33. A clamp screw 36 extends and slides through a slot 37 in member 33 and has a screw seat in the bolt 35. The end of the trap member 33 has the ends of its flanges 38 bevelled off to overlap and engage the bevelled ends of the adjacent duct member to prevent the trap member from engaging the bus bar. The drop-out or trap door may be hinged to a duct section or to an end piece 39 as shown in Fig. 2.

The trolley collector may be formed in various ways. For instance, it may have a box 40 (Fig. 4) with conventional plug-in sockets shown at 40' for the branch conductors. In any event it has a pair of side arms 41 secured to the box and adapted to extend through the slots 13, 13. These arms may be a part of a channel-like member which is secured to the box or a part of or secured to the box in any suitable manner. Guide rollers or wheels 42 are carried by these arms and ride on the flanges 12 which serve as guide tracks or rails. The parts are so proportioned and spaced that the wheels are guarded by the wall of the duct member 9 and can not jump the tracks, and the trolley may operate with the duct mounted in any position. Contacts 43 are carried by the arms 41 and are spring pressed against the bus bars. These arms provide protected ducts 44 for the conductors from the branch box 40 to the contacts, in the insulating housings 40''.

The collector is mounted on the rails by spanning the arms 41 across an uncovered portion of the bus bars at any entrance point and sliding the box along said bus bars until the wheels engage with the rails in the covered portion of the duct. The box may have a loosely hinged handle or bail 45.

Fig. 7 shows another form of branch box 46 with a cable connection 47.

It will be seen from the foregoing that the duct construction is very simple and easily installed and inspected. It requires but few easily made parts for its main construction and but few additional parts for the drop-out or trolley connection. The channel-like shape has a maximum strength for a given weight and size and is easily made. The trolley itself is also very simple and smoothly supported. The overlapping of the top and bottom parts of the duct or casing prevents accidental grounding of a bus bar to the casing for instance by the insertion of a screw driver or other metal object through the side slots.

The rolled or curled edges of the top part of the duct further strengthen the assembly and eliminate exposed sharp edges and serves as a very convenient medium for attaching hangers, tap boxes and other auxiliary equipment at any point along the run. The turned up edges of the lower member of the duct not only strengthens the assembly but being located within the upper part eliminate exposed sharp edges. They also serve as guiding rails or tracks for the trolley collector wheels.

The top of the casing is spaced from the upper edges of the rails just sufficient to furnish clearance for the trolley wheels but prevent the wheels from jumping the rails. Although the duct is usually mounted horizontally the present construction permits operation of the trolley regardless of the position of the casing or duct.

By locating the slots for the trolley along the sides of the bus bars the depth of the enclosure is kept at a minimum. By running the two slots with a guide rail adjacent each slot at substantially the corners of the casing we stabilize the collector by giving it as wide a base as possible for support.

The hinged collector drop-out piece permits opening of the casing for insertion of a collector or for inspection of bus bar connections. The hinged collector drop-out pieces also serve to join sections of the enclosure.

The method of supporting the bus bars is simple and requires no drilling or tapping and the construction of the bus bars makes it possible to connect successive lengths of the bus bars by the simple telescopic joining or splicing pieces.

Where the drop-out is omitted of course an ordinary length of the channel-like member will be used.

The bus bar insulating supports also serve to space the parts 9 and 10 of the casing apart and hold them in proper relation to each other and to the bus bars.

It will be understood that the duct may be made up in standard lengths.

We claim:

1. In a bus duct system, a duct comprising a channel-like outer duct member and a narrower inner duct member secured thereto, said members having flanges which extend in opposite directions and overlap but are spaced apart to leave trolley slots along the opposite flanges of the narrower duct member, and bus bars supported between said members and accessible through the respective slots, the flanges of the narrower duct member constituting tracks for supporting a trolley collector.

2. In a bus duct system, a duct comprising a channel-like upper duct member and a narrower lower duct member secured thereto, said members having flanges which extend in opposite directions and overlap but are spaced apart to leave trolley slots along the opposite flanges of the narrower duct member, insulators connecting said duct members and adapted to support bus bars within and insulated from said duct, the flanges of the narrower duct member constituting tracks for supporting a trolley collector.

3. In a bus duct system, a duct comprising a channel-like upper duct member and a narrower lower duct member secured thereto, said members having flanges extending in opposite directions and spaced apart to leave trolley slots along the opposite flanges of the narrower duct member, insulators connected to the upper duct member, bus bars supported in said insulators and accessible through the respective slots, means for detachably securing said lower duct member to said insulators, the flanges of the narrower duct member constituting tracks for supporting a trolley collector.

4. In a bus duct system, a duct comprising a channel-like upper duct member and a narrower lower duct member secured thereto, said members having flanges which extend in opposite directions and overlap but are spaced apart to leave trolley slots along the opposite flanges of the narrower duct member, insulators connected to the upper duct member, bus bars supported by said insulators and accessible through the respective slots, the flanges of the narrower duct member constituting tracks for supporting a trolley collector and means for supporting the lower duct member from the upper duct member.

5. In a bus duct system, a flanged main duct member and a narrower flanged duct member mounted within the main duct member, said members having flanges extending in opposite directions and with a slot left between each flange of the main duct member and a flange of the narrower duct member, bus bars supported between the duct members and a trolley collector having arms extending through said slots and carrying wheels supported on the flanges of the narrower duct member and contacts slidable against the respective bus bars.

6. In a bus duct system, a flanged cover duct member and a narrower flanged floor duct member secured within the main duct member, said members having flanges extending in opposite directions and with a slot left between each flange of the cover duct member and a flange of the narrower floor duct member, bus bars supported between the duct members and a trolley collector having arms extending through said slots and carrying wheels supported on the flanges of the narrower floor duct member and contacts slidable against the respective bus bars, the distance between the upper surfaces of the guide tracks and the opposite wall of the cover member being less than the overall diameter of the trolley wheels but sufficient to leave clearance for the trolley wheels to run on the tracks.

7. In a bus duct system, a duct comprising a channel-like upper duct member and a narrower lower duct member secured thereto, said members having flanges which extend in opposite directions and overlap but are spaced apart to leave trolley slots along the opposite flanges of the narrower duct member, bus bars supported between said members and accessible through the respective slots, the flanges of the narrower duct member constituting tracks for supporting a trolley collector and a trolley collector having sides which extend through the slots along the opposite flanges of the narrower duct member, wheels carried by the sides of the collector running along the tracks and contacts carried by said sides and coacting with the respective bus bars.

8. In a bus duct system, a duct comprising a channel-like cover duct member and a narrower lower duct member secured thereto, said members having flanges which extend in opposite directions and overlap but are spaced apart to leave trolley slots along the opposite flanges of the narrower duct member, bus bars supported between said members and accessible through the respective slots, the flanges of the narrower duct member constituting tracks for supporting a trolley collector and a trolley collector having a channel-like member embracing the narrower duct member and having sides extending through the slots along the opposite flanges of the narrower duct member, wheels carried by the sides of the channel-like member rolling along the flanges of the narrower duct member, the distance between the upper surfaces of the guide tracks and the opposite wall of the cover member being less than the overall diameter of the trolley wheels but sufficient to leave clearance for the trolley wheels to run on the tracks, and contacts carried by said sides and coacting with the respective bus bars.

9. In a bus duct system, a duct comprising a channel-like upper duct member and a narrower lower duct member secured thereto, said members having flanges which extend in opposite directions and overlap but are spaced apart to leave trolley slots along the opposite flanges of the narrower duct member and bus bars supported between said members and not readily accessible through the respective slots, the flanges of the narrower duct member constituting tracks for supporting a trolley collector, the flanges of the upper duct member terminating in rolled edges for supporting hangers having edges flanged and interlocked with said rolled edges of the upper duct member.

10. In a bus duct system, a duct comprising a channel-like cover duct member and a narrower lower track duct member secured thereto, said members having flanges which extend in opposite directions and are spaced apart to leave trolley slots along the opposite flanges of the narrower track duct member, bus bars supported between said members, the flanges of the narrower duct member constituting tracks for supporting a trolley collector, the flanges of the upper duct member terminating in rolled edges and supporting hangers having edges flanged and interlocked with said rolled edges of the upper duct member.

11. In a bus duct system, a duct comprising a channel-like outer duct member and a narrower inner duct member secured thereto, said members having flanges which extend in opposite directions and overlap but are spaced apart to leave trolley slots along the opposite flanges of the narrower duct member and bus bars supported between said duct members, the flanges of the narrower inner duct member constituting tracks for supporting a trolley collector, a portion of the narrower duct member being hinged to swing away from the plane of the adjacent portions of said duct member to provide access to the bus bars and to permit insertion and removal of a trolley collector.

12. In a bus duct system, a duct comprising a main channel-like covering duct member and a narrower track duct member secured thereto, said members having flanges which extend in opposite directions and are spaced apart to leave trolley slots along the opposite flanges of the narrower duct member, bus bars supported between said members and between the flanges of the track duct members, the flanges of the narrower duct member constituting tracks for supporting a trolley collector, a portion of the narrower duct member being hinged to swing away from the plane of the adjacent portions of said duct member to provide access to the bus bars.

13. In a bus duct system, a duct comprising a channel-like outer duct member and a narrower inner duct member secured thereto, said members having flanges which extend in opposite directions and overlap but are spaced apart to leave trolley slots along the opposite flanges of the narrower duct member and bus bars supported between said duct members, the flanges of the narrower inner duct member constituting tracks for supporting a trolley collector, a portion of the narrower duct member being hinged to swing away from the plane of the adjacent portions of said duct member to provide access to the bus bars and to permit insertion and removal of a trolley collector and means for interlocking the hinged portion to the narrower duct member.

14. In a bus duct system, a duct comprising a channel-like outer duct member and a narrower inner duct member secured thereto, said members having flanges which extend in opposite directions and overlap but are spaced apart to leave trolley slots along the opposite flanges of the narrower duct member and bus bars supported between said duct members, the flanges of the narrower inner duct member constituting tracks for supporting a trolley collector, a portion of the narrower duct member being hinged to swing away from the plane of the adjacent portions of said duct member to provide access to the bus bars and to permit insertion and removal of a trolley collector and a bolt carried by the hinged portion for coacting with the narrower duct member to interlock said portion and member.

15. In a bus duct system, a duct comprising a channel-like outer duct member and a narrower inner duct member secured thereto, said members having flanges which extend in opposite directions and overlap but are spaced apart to leave trolley slots along the opposite flanges of the narrower duct member and bus bars supported between said duct members, the flanges of the narrower inner duct member constituting tracks for supporting a trolley collector, a portion of the narrower duct member being hinged to swing away from the plane of the adjacent portions of said duct member to provide access to the bus bars and to permit insertion and removal of a trolley collector, said hinged portion and narrower duct member having coacting edges for limiting the inward swing of the hinged portion.

WILLIAM C. ANDERSON.
GEORGE J. NABER.